(12) United States Patent
Kaczmarczyk et al.

(10) Patent No.: US 10,732,027 B2
(45) Date of Patent: Aug. 4, 2020

(54) AUXILIARY PAYMENT STATION IN THE FORM OF A SHOPPING TROLLEY

(71) Applicant: ZeroQs Sp. z o.o., Olsztyn (PL)

(72) Inventors: Jarosław Kaczmarczyk, Radzymin (PL); Tomasz Bruliński, Ciechanów (PL)

(73) Assignee: ZEROQS SP, Z O.O. (PL)

( * ) Notice: Subject to any disclaimer, the term of this patent is extended or adjusted under 35 U.S.C. 154(b) by 104 days.

(21) Appl. No.: 16/095,026

(22) PCT Filed: Apr. 18, 2017

(86) PCT No.: PCT/PL2017/050022
§ 371 (c)(1),
(2) Date: Oct. 19, 2018

(87) PCT Pub. No.: WO2017/184003
PCT Pub. Date: Oct. 26, 2017

(65) Prior Publication Data
US 2019/0145816 A1 May 16, 2019

(30) Foreign Application Priority Data
Apr. 20, 2016 (PL) .................................. P.416908

(51) Int. Cl.
*G01G 19/414* (2006.01)
*B62B 3/14* (2006.01)
(Continued)

(52) U.S. Cl.
CPC .............. *G01G 21/23* (2013.01); *B62B 3/14* (2013.01); *B62B 5/00* (2013.01); *G01G 19/4144* (2013.01);
(Continued)

(58) Field of Classification Search
CPC ...... G01G 19/52; G01G 21/23; G01G 23/005; G01G 19/4144; B62B 5/00; B62B 3/14; G06Q 30/0633
(Continued)

(56) References Cited

U.S. PATENT DOCUMENTS 5,551,578 A * 9/1996 McCue .................... A47F 10/04
211/17
5,662,342 A * 9/1997 Basharat ............... B62B 3/1476
280/33.994

(Continued)

FOREIGN PATENT DOCUMENTS

DE     19643122 A      4/1998
DE     019944153  *    8/2000
(Continued)

OTHER PUBLICATIONS

PCT International Search Report and Written Opinion dated Jul. 21, 2017 in corresponding Application No. PCT/PL2017/050022, 9 pages.

*Primary Examiner* — Jacques M Saint Surin
(74) *Attorney, Agent, or Firm* — Dilworth IP, LLC

(57) ABSTRACT

An auxiliary payment station in the form of a shopping trolley with a scale fixed to its bottom, including elements of electronic equipment located in a casing mounted in the container, and visual elements of the electronic equipment fixed to a handle of the container. A loading inner container is located in an outer container, and a mounting plate of a carrying frame is fixed to a bottom of the scale, and an edge mounting plate of the carrying frame is fixed to a bottom of the outer container at its edge. The mounting plate of the carrying frame is fixed on a bar of the carrying frame extending through an opening in the bottom of the outer container.

9 Claims, 1 Drawing Sheet

(51) Int. Cl.
  *B62B 5/00* (2006.01)
  *G01G 19/52* (2006.01)
  *G06Q 30/06* (2012.01)
  *G01G 21/23* (2006.01)

(52) U.S. Cl.
  CPC ......... *G01G 19/52* (2013.01); *G06Q 30/0633* (2013.01)

(58) Field of Classification Search
  USPC .......................................................... 177/136
  See application file for complete search history.

(56) References Cited

U.S. PATENT DOCUMENTS

| | | | |
|---|---|---|---|
| 5,729,697 A * | 3/1998 | Schkolnick | G07F 7/02 705/23 |
| 8,371,504 B2 * | 2/2013 | Connelly | B62B 3/148 235/375 |
| 10,266,196 B1 * | 4/2019 | Sinha | B62B 3/1416 |
| 2004/0026503 A1 * | 2/2004 | Gantz | G06Q 20/343 235/383 |
| 2015/0206121 A1 | 7/2015 | Bentsur et al. | |

FOREIGN PATENT DOCUMENTS

| | | | |
|---|---|---|---|
| GB | 2457315 | * | 8/2009 |
| GB | 2472657 A | | 2/2011 |
| PL | 408977 A | | 2/2016 |
| WO | 2006085745 A | | 8/2006 |

\* cited by examiner

AUXILIARY PAYMENT STATION IN THE FORM OF A SHOPPING TROLLEY

TECHNICAL FIELD

The object of the invention is an auxiliary payment station in the form of a shopping trolley used in particular in self-service stationary stores.

BACKGROUND OF THE INVENTION

From the Polish patent application P.408977, entitled "Stanowisko płatnicze w samoobsługowych . . . ", there is known an auxiliary payment station in the form of a shopping trolley. It is characterized by the fact that a barcode reader is located on a metal plate fixed between a handle of the trolley and an upper edge of a loading basket. Also, an auxiliary touchscreen in a plastic casing is fixed between the handle of the trolley and the upper edge of the loading basket. A bottom of the loading basket is formed by a horizontally arranged polymeric plate to which a scale in the form of a platform is fixed. There is a plastic casing present in the front part of the loading basket. Inside it there is an auxiliary control computer, an auxiliary wireless Wi-Fi connection module, an electric battery and an RFID identifier. In a front wheel, a wheel rotation speed monitoring system is arranged, consisting of an inductive sensor and a toothed ring. Inside the casing there are cap-protected openings with leads for electric battery terminals. This provides for charging thereof from a 230 V electrical grid using a suitable rectifier.

A disadvantage of the known solution is exposing the scale to damage and decalibration, which may result from impacts occurring in everyday use.

SUMMARY OF THE INVENTION

The object of the invention is to eliminate factors affecting rapid destruction of the scale.

The essence of the solution according to the invention is that a loading inner container is located in an outer container, and a mounting plate of a carrying frame is fixed to a bottom of a scale. An edge mounting plate of the carrying frame is fixed to a bottom of the outer container at its edge. The mounting plate of the carrying frame is fixed on a bar of the carrying frame extending through an opening in the bottom of the outer container. The mounting plates of the carrying frame are fixed by welding. The mounting plates of the carrying frame are fixed with screws.

The scale is fixed to a bottom of the loading inner container by welding. The scale is fixed to the bottom of the loading inner container by means of screws.

BRIEF DESCRIPTION OF DRAWINGS

The object of the invention is illustrated by an example of embodiment in a drawing wherein.

EXAMPLES

Detailed Description of the Invention

Figure 1:
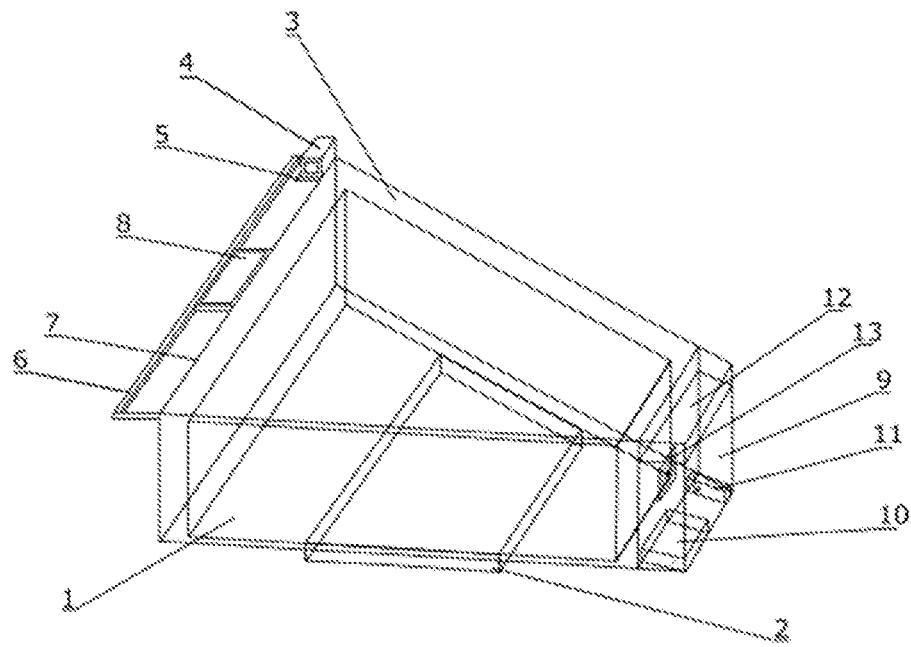
FIG. 1 shows an auxiliary payment station in a perspective view without considering a carrying frame, and FIG. 2—the auxiliary payment station in side view including the carrying frame.
Figure 2:
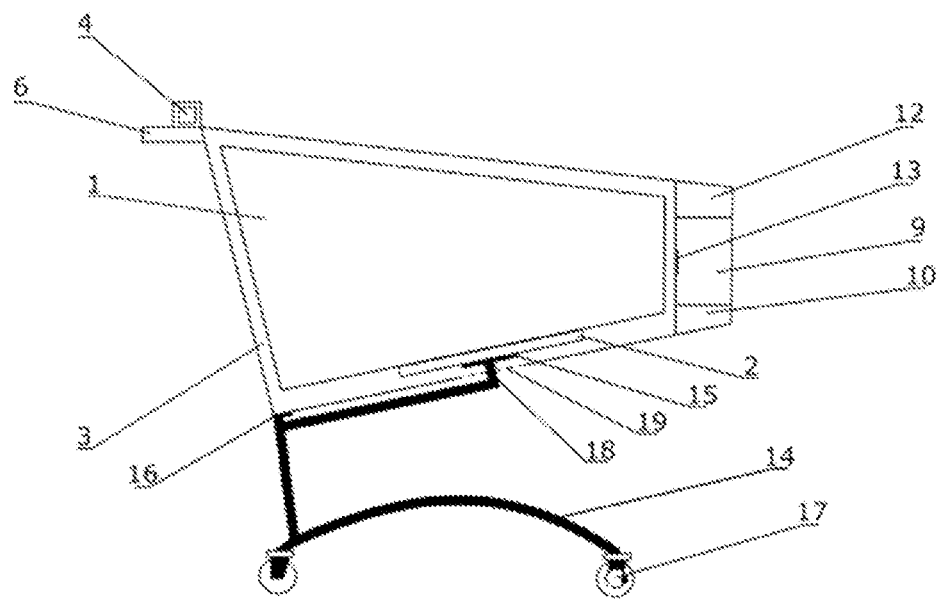

As shown in FIG. 1 and FIG. 2, the auxiliary payment station includes a loading inner container 1 located inside an outer container 3. A scale 2 in the form of a platform is fixed by welding to an outer bottom surface of the loading inner container. A mounting plate 15 of a carrying frame 14 is welded to a bottom surface of the scale 2. The mounting plate 15 is fixed on a bar 18 of the carrying frame 14, which extends through an opening 19 in a bottom of the outer container 3. The carrying frame 14 is provided on its edge with an edge mounting plate 16 that is welded to the bottom of the outer container 3 at its edge. The carrying frame 14 has wheels mounted at the bottom. In a front wheel, a wheel rotation speed monitoring system 17 is arranged, consisting of an inductive sensor and a toothed ring.

A plate 5 and an auxiliary touchscreen 8 are fixed between a handle 6 of the outer container and an upper edge 7 thereof. A barcode reader 4 is located on the plate 5. In the front part of the outer container 3 there is a casing 9 fixed. Inside it, there are an auxiliary control computer 10, an auxiliary wireless connection module 11, an electric battery 12 and an RFID identifier 13. Inside the casing 9 there are cap-protected openings with leads for electric battery 12 terminals. This provides for charging thereof from a 230 V electrical grid using a suitable rectifier.

Both containers 1, 3 are mounted on the carrying frame 14 independently of each other and they don't contact each other directly at any point of the structure. Such structure protects the scale 2 from such factors as impacts that may cause damage thereto and decalibration thereof, as the outer container 3 fulfills, among others, a protective role for the loading inner container 1.

LIST OF DESIGNATIONS

1. Loading inner container
2. Scale
3. Outer container
4. Barcode reader
5. Plate
6. Handle of the outer container
7. Upper edge of the outer container
8. Auxiliary touchscreen
9. Casing
10. Auxiliary control computer
11. Auxiliary wireless connection module
12. Electric battery
13. RFID identifier
14. Carrying frame
15 Mounting plate
16. Edge mounting plate
17. Wheel rotation speed monitoring system
18 Bar
19 Opening

The invention claimed is:

1. An auxiliary payment station in the form of a shopping trolley comprising a loading container, mounted on a carrying frame provided with wheels, with a scale fixed to a bottom of said loading container, elements of electronic equipment located in a casing mounted in the container, and visual elements of the electronic equipment fixed to a handle of the container, characterized in that a loading inner container is located in an outer container, and a mounting plate of the carrying frame is fixed to a bottom of the scale, and an edge mounting plate of the carrying frame is fixed to a bottom of the outer container, at its edge, wherein the mounting plate of the carrying frame is fixed on a bar of the carrying frame extending through an opening in the bottom of the outer container.

2. The auxiliary station according to claim 1, characterized in that the mounting plates of the carrying frame are fixed by welding.

3. The auxiliary station according to claim 1, characterized in that the mounting plates of the carrying frame are fixed with screws.

4. The auxiliary station according to claim 1, characterized in that the scale is fixed to the bottom of the loading inner container by welding.

5. The auxiliary station according to claim 1, characterized in that the scale is fixed to the bottom of the loading inner container by means of screws.

6. The auxiliary station according to claim 2, characterized in that the scale is fixed to the bottom of the loading inner container by welding.

7. The auxiliary station according to claim 3, characterized in that the scale is fixed to the bottom of the loading inner container by welding.

8. The auxiliary station according to claim 2, characterized in that the scale is fixed to the bottom of the loading inner container by means of screws.

9. The auxiliary station according to claim 3, characterized in that the scale is fixed to the bottom of the loading inner container by means of screws.

\* \* \* \* \*